United States Patent
Mestha et al.

(10) Patent No.: US 6,556,932 B1
(45) Date of Patent: Apr. 29, 2003

(54) SYSTEM AND METHOD FOR RECONSTRUCTION OF SPECTRAL CURVES USING MEASUREMENTS FROM A COLOR SENSOR AND A SPECTRAL MEASUREMENT SYSTEM MODEL

(75) Inventors: Lingappa K. Mestha, Fairport, NY (US); Yao Wang, Webster, NY (US); Fred F. Hubble, III, Rochester, NY (US); Tonya L. Love, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 156 days.

(21) Appl. No.: 09/621,860

(22) Filed: Jul. 21, 2000

Related U.S. Application Data
(60) Provisional application No. 60/200,878, filed on May 1, 2000.

(51) Int. Cl.$^7$ ............................................. G01R 23/16
(52) U.S. Cl. ........................................ 702/76; 356/303
(58) Field of Search ................. 356/303, 306, 356/309, 317, 319, 320, 323; 382/162, 167; 348/370; 702/75–78, 28, 159, 172, 189, FOR 117, FOR 131, FOR 134, FOR 168, FOR 170, FOR 148

(56) References Cited

U.S. PATENT DOCUMENTS

| | | | | |
|---|---|---|---|---|
| 4,648,051 A | * | 3/1987 | Wandell et al. | 382/162 |
| 4,830,020 A | * | 5/1989 | Ruth | 600/504 |
| 4,992,963 A | * | 2/1991 | Funt et al. | 382/162 |
| 5,082,529 A | * | 1/1992 | Burk | 162/198 |
| 5,107,332 A | | 4/1992 | Chan | 358/518 |
| 5,537,516 A | | 7/1996 | Sherman et al. | 358/1.9 |
| 5,671,059 A | | 9/1997 | Vincent | 356/402 |
| 5,723,517 A | * | 3/1998 | Campo et al. | 523/303 |
| 5,844,680 A | * | 12/1998 | Sperling | 356/303 |
| 5,963,244 A | | 10/1999 | Mestha et al. | 347/251 |
| 6,178,007 B1 | | 1/2001 | Harrington | 358/1.9 |
| 6,263,291 B1 | * | 7/2001 | Shakespeare et al. | 702/85 |
| 6,304,294 B1 | * | 10/2001 | Tao et al. | 348/370 |

OTHER PUBLICATIONS

Laurence T. Maloney and Brian A. Wandell, Color constancy: a method for recovering surface spectral reflectance, Jan. 1986, Journal of the Optical Society of America A, pp. 29–33.*

Gretag Imaging http://www.gretagimaginign.ch/main.asp.

X–rite www.xrite.com/p1–3.

Jasskelainen et al. "Vector–subspace model for color representation" "Optical Society of America" vol. 7. No. 4/Apr. 1990.

* cited by examiner

*Primary Examiner*—Hal Wachsman
*Assistant Examiner*—Mohamed Charioui
(74) *Attorney, Agent, or Firm*—Oliff & Berridge, PLC

(57) ABSTRACT

By using a reconstruction algorithm, based on the spectral characteristics of the illumination source and a color sensing system, a spectral curve reconstruction device converts measurements from a non-fully illuminant populated color sensor into a fully populated spectral curve. This is done using a spectral measurement system model, which may use basis vectors.

15 Claims, 4 Drawing Sheets

FIRST THREE PRINCIPAL COMPONENTS OF THE COLOR GAMUT

SYSTEM AND METHOD FOR RECONSTRUCTION OF SPECTRAL CURVES USING MEASUREMENTS FROM A COLOR SENSOR AND A SPECTRAL MEASUREMENT SYSTEM MODEL

This application claims the benefit of Provisional application No. 60/200,878, filed May 1, 2000.

BACKGROUND OF THE INVENTION

1. Field of Invention

This invention is related to image processing systems. In particular, this invention is directed toward a system and method that determines a spectral curve from a color sensor.

2. Description of Related Art

A typical spectrophotometer measures the reflectance of an illuminated object of interest over a plurality of light wavelengths. Typical prior spectrophotometers in this context used 16 or more channels measuring from approximately 400 nm to 700 nm, to cover the visible color spectrum or wavelength range. A typical spectrophotometer gives color information in terms of measured reflectances or transmittances of light, at the different wavelengths of light, from the test surface. This spectrophotometer desirably provides distinct electric signals corresponding to the different levels of reflected light received from the respective different illumination wavelength ranges or channels.

Another way to measure a full reflectance spectra of color samples over the entire visible range is to have monochromatic LEDs on a sensor head with the LED response curves dispersed at wavelengths where the reflectance measurement is desired. For example, in principle, to obtain 36 reflectance values each separated by 10 nm, at least 36 monochromatic LEDs would be desired on the sensor head.

SUMMARY OF THE INVENTION

However, it is not efficient to install a typical spectrophotometer, due to cost considerations, or to have 36 LEDs in every image processing system, since LEDs are not monochromatic. As an alternative, a multiple light emitting diode (LED) reflectance spectrophotometer, such as that described in copending U.S. Ser. No. 09/535,007, incorporated herein by reference in its entirety, illuminates a target with a narrow band or monochromatic light. For a low cost implementation of the color sensor based on a multiple illuminant device as the illumination source, generally, for example, 10, 12 or 16 LEDs are selected. Each LED is selected to have a narrow band response curve in the spectral space. Therefore, for example, ten LEDs would correspond to ten measurements in the reflectance curve. The LEDs, or other multiple illuminant based color sensor equivalent, e.g., lasers, are switched on one at a time as, for example, the measured media is passed through a transport of a printer. The reflected light is then detected by a photodetector and the corresponding voltage integrated and normalized with a white tile. The system and method of this invention use the integrated sensor measurements to determine a fully populated reflectance spectra with reflectance values at specific wavelengths, even though some of the light sources may not produce spectral content at the distant ends of the visible spectrum.

By using a reconstruction algorithm, based on the spectral characteristics of the illumination source and the color sensing system, the integrated multiple illuminant measurements from a non-fully illuminant populated color sensor are converted into a fully populated spectral curve. For an alternative approach to determining a spectral curve see copending U.S. application Ser. No. 09/562,072, filed herewith and incorporated herein by reference in its entirety.

The implementation of the model based reconstruction algorithm is a pre-determined look-up table that can be referenced whenever a spectral output or a L*a*b* or XYZ values are required for the sample from one of the illuminant sensors under test.

Therefore, the system and method of this invention use a spectral measurement system model to convert a number of multiple illuminant sensor voltages to reflectance values independently of the response curve of the illuminant devices.

In particular, a limited number of voltage measurements are received from, for example, a LED color sensor at the direction of a color sensor controller. The received sensor voltage measurements are then normalized in accordance with white tile measurements which are a standard practice and are well known in the color measurement industry. Next, new coefficients for a spectral reconstruction curve are determined. In particular, by using, for example, a parameterized neural network or a statistical model based on a sufficiently large training sample, the measured LED spectral emission characteristics are determined and stored in a look-up table for the LED undergoing measurement. Then, for every new measurement that is made, for example, by switching an LED on and off and measuring the reflected light, the basis vectors of the color space, the detector spectra, the integration time of the measurements and a scaling factor, which accounts for inaccuracies in the electronics of the system, are used to determine the new coefficients. Next, the basis vectors are weighted by these newly determined coefficients to produce a full spectral reflectance output curve.

For a more detailed discussion of determining basis vectors see, for example, T. Jaaskelainen "Vector subspace model for color representation." Vol. 7, No. 4, April 1990, J. Opt. Soc. Am. A. and J. P. S. Parkkinen "Characteristic spectra of Munsell colors." Vol. 6, No. 2, February 1989, J. Opt. Soc. Am. A., both of which are incorporated herein by reference in their entirety.

This invention provides a system and method that determine a full spectral reflectance curve.

This invention separately provides a system and method that determine a full spectral curve using measurements from a switched multiple illuminant color sensor.

This invention separately provides a system and method that determine a full spectral curve using measurements from a switched multiple LED color sensor.

This invention additionally provides a system and method in which a system model is used for spectral reconstruction.

Furthermore, it should be appreciated that the system and method disclosed in this application can be used as a foundation for determining a full reflectance curve when multiple detectors are used.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
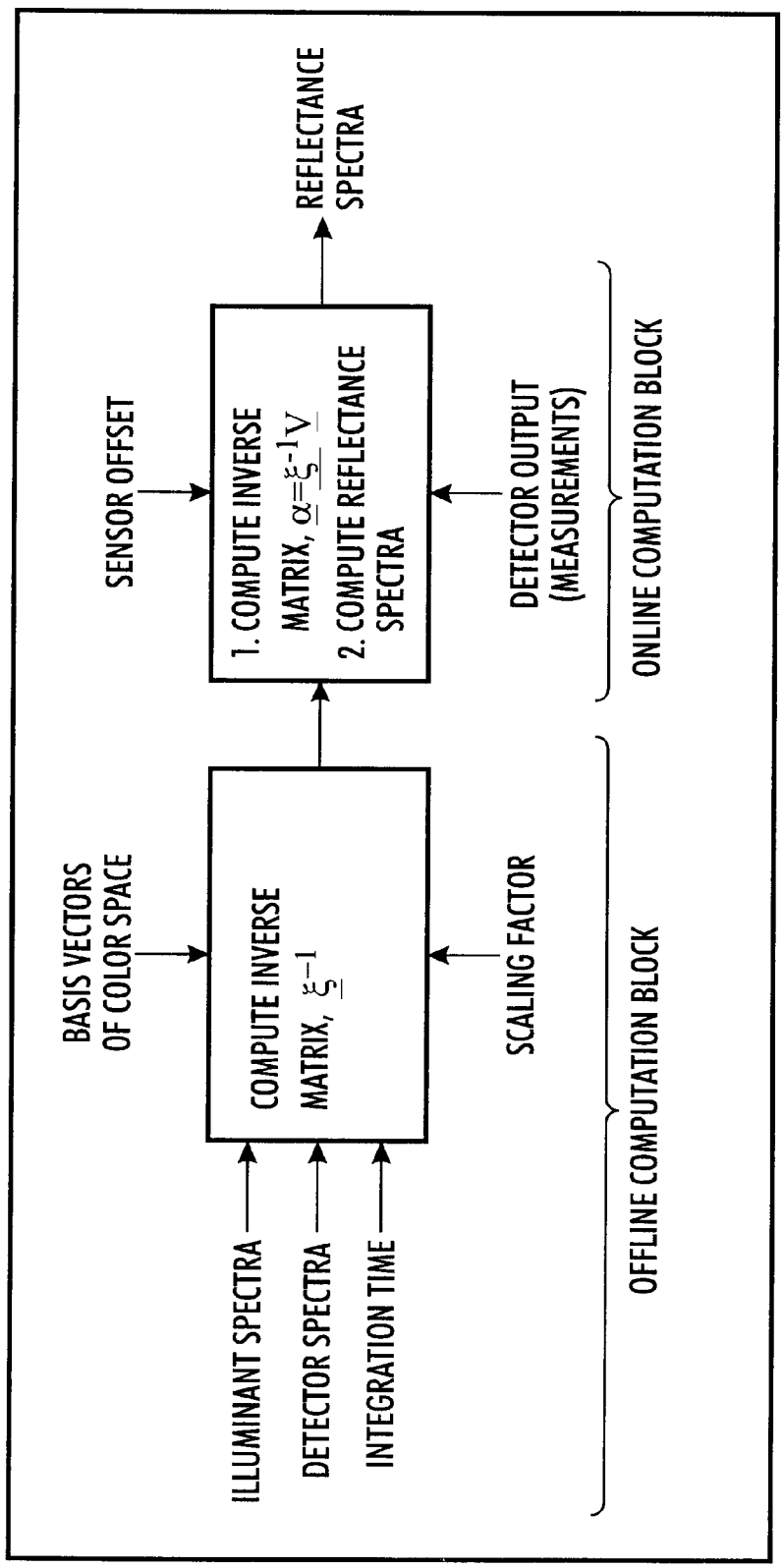
FIG. 1 is a functional block diagram illustrating an exemplary method for determining a reflectance spectra according to this invention.

FIG. 1 generally illustrates the two step process of determining a full spectral curve from a limited number of illuminant sources according to this invention. Specifically, the spectral characteristics of the illuminant source(s) and accompanying detection device(s) are determined and stored as a model in, for example, a look-up table. In particular, the illuminant spectra, the detector spectra, the integration time, the basis vectors of the color space and a scaling factor are input to determine a matrix representing the composite spatial function of the color measurement system. Next, using this model, a sensing system offset, i.e. sensor offset, and the output measured from the photodetector are input to determine a coefficient vector from which the full reflectance spectra is determined.

Figure 2:
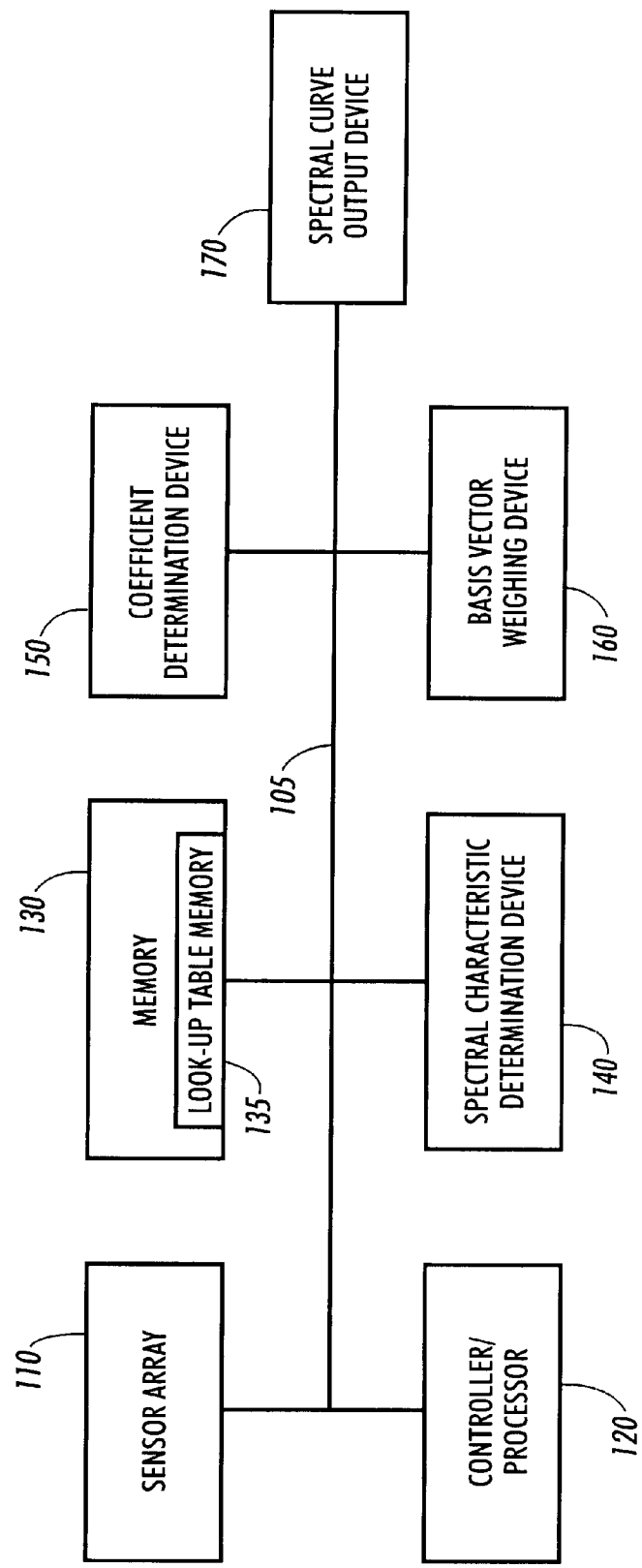
FIG. 2 is a functional block diagram illustrating an exemplary spectral curve reconstruction device according to this invention.

FIG. 2 illustrates a spectral curve determination device 100 in accordance with this invention. The spectral curve determination device 100 comprises a multiple illuminant sensor array 110, a controller/processor 120, a memory 130, comprising a look-up table memory 135, a spectral characteristic determination device 140, a coefficient determination device 150, a basis vector weighing device 160 and a spectral curve output device 170 all interconnected by link 105.

The link 105 can be any wired or wireless link, or combination thereof, that supplies information between the connected elements. For example, the link 105 can be a network, such as a LAN, a WAN, an intranet or the Internet. Thus, the connected elements may be, for example, collocated at an image processing device, or alternatively, distributed throughout a network or located at a remote spectral curve reconstruction device.

First, a spectral measurement system model is used to determine the reflectance spectra of the substrate from the sensor measurements. Then, the use of the spectral measurement system model is illustrated to determine a spectral curve based on a limited number of illuminant measurements.

The spectral measurement system model is a reflection model. In operation, sensor measurements are received from an LED sensor head, such as that disclosed in copending application Ser. No. 09/535,007, at the direction of the controller/processor 120. While the preferred embodiment will be discussed in relation to an LED based sensor head, it is to be appreciated that any multiple illuminant sensor head will work equally well with the systems and methods of this invention. Therefore, assuming a uniform layer of color is printed on a medium that behaves like a diffuse reflector where the collective reflectance spectra of the color is represented by $R(\lambda)$. The light flux reflected from the substrate is collected, transformed to an electrical signal by a detector in the sensor array 110, and integrated and amplified in the detector circuitry for a specified time. If $D(\lambda)$ is the detector spectral response, reflected light from the substrate upon lighting each illuminant, e.g. LED or laser, in the sensor array 110, whose spectra is denoted by $S_i(\lambda)$, may be integrated for different lengths of time to establish a sufficient signal to noise ratio. For example, as illustrated in copending U.S. Ser. No. 09/535,007, the integration time is selected for each LED by using white tile measurements. If $\tau_i$ is the integration time for each switching event, and $V_i$ is the measure of the amount of integrated light flux at the output of the detector circuitry, then the simplest first order linear model, which ignores the effects due to scattering, transmission, illumination geometry, and the like, of the sensing system for a single switching event is:

$$V_i = k_i \int_0^{\tau_i} \int_{\lambda_{min}}^{\lambda_{max}} S_i(\lambda) R(\lambda) D(\lambda) d\lambda d\tau + V_i^o, \quad (1)$$

where $V_i$ is the output of the detector, $V_i^o$ is the sensor offset, i.e., black measurement, in the switching system, which is normally the output of the detector when the LEDs are not turned on, and $k_i$ is the scaling factor for each measurement. The scaling factor is extracted by the spectral characteristic determination device 140, at the direction of controller/processor 120, using the output from the sensor detected from white tiles or by using the training samples. This scaling factor is determined every time a sensor calibration is run using a white tile.

Initially, the reflectance spectra is modeled assuming that the principal components are available in the form of functions. In particular, the reflectance spectra is modeled as the linear combination of the principal components as follows:

$$R(\lambda) = \sum_{l=0}^{N} \alpha_l \phi_l(\lambda), \quad (2)$$

where $\phi_l(\lambda)$ for $l=0,1,2,\ldots,N$ where N is the number of a basis vector.

Figure 3:
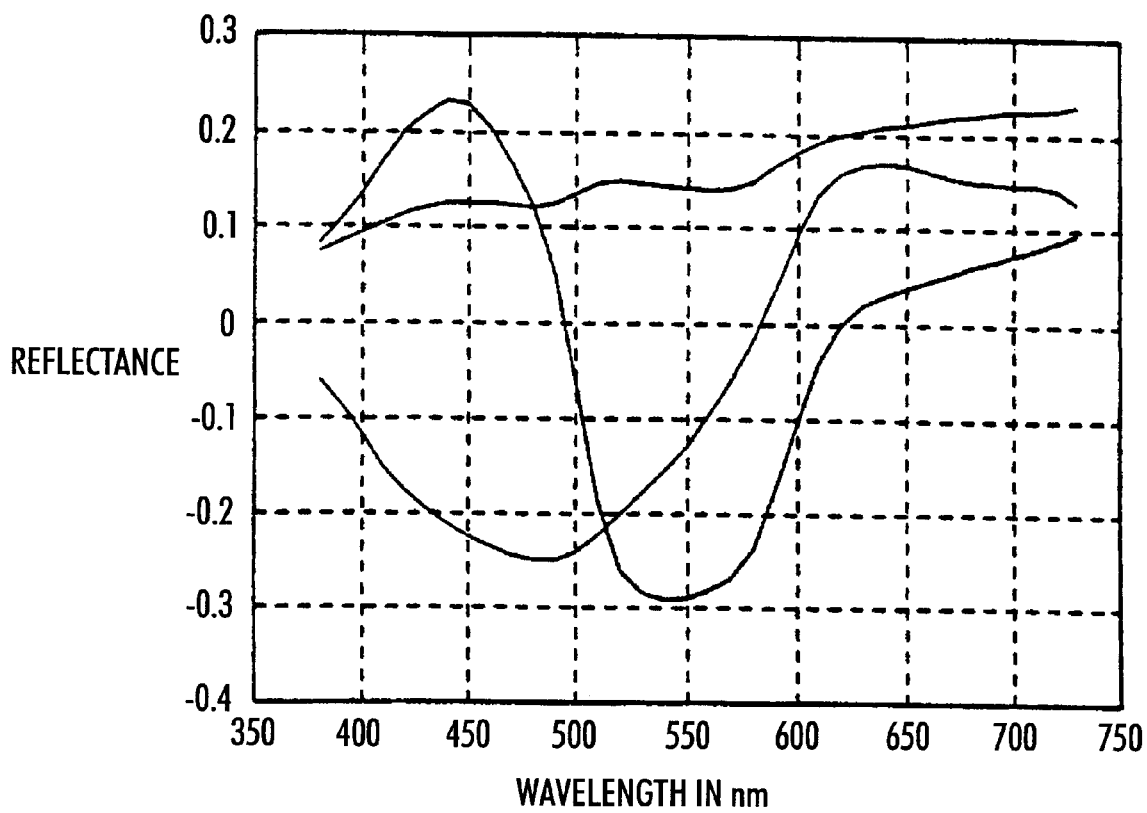
FIG. 3 is a graph illustrating three exemplary spectral characteristics of the color gamut determined according to this invention.

The first three basis vectors are illustrated in FIG. 3. Specifically, three function basis vectors $\phi_0(\lambda)$, $\phi_1(\lambda)$ and $\phi_2(\lambda)$ are illustrated for the color gamut. From an exemplary 10 LED spectrophotometer with one detector, 10 vectors are needed. M is the maximum number of measurements from the sensor. When a sensing device, such as that illustrated in copending U.S. Ser. No. 09/535,007, i.e., a device with an image sensor that typically has three rows of photosites that are coated with 3 different color filter layers, red, green and blue, providing three color measurement capability for each LED is used, there could be more than one measurement when each LED is illuminated.

By substituting Eq. 2 into Eq. 1 and rearranging the resulting expression for the exemplary 10 LED device, the internal coefficients of the algorithm are determined as follows:

$$\begin{bmatrix} \alpha_1 \\ \alpha_2 \\ \vdots \\ \alpha_N \end{bmatrix} = \begin{bmatrix} \xi_{11} & \xi_{12} & \cdots & \xi_{1N} \\ \xi_{21} & \xi_{22} & & \xi_{2N} \\ & & & \vdots \\ \xi_{M1} & \xi_{M2} & & \xi_{MN} \end{bmatrix}^{-1} \begin{bmatrix} V_1 - V_1^o \\ V_2 - V_2^o \\ \vdots \\ V_M - V_M^o \end{bmatrix} \text{ for } N = M \quad (3)$$

In vector form, Eq. 3 is represented as;

$$\underline{\alpha} = \underline{\xi}^{-1} \underline{V}, \quad (4)$$

where the composite spectral function matrix, $\xi$, containing matrix elements $\xi_{il}$ for $i=1,2,\ldots,M$ and $l=1,2,\ldots N$, are expressed by the following equation:

$$\xi_{il} = k_i \int_0^{\tau_i} \int_{\lambda_{min}}^{\lambda_{max}} S_i(\lambda) D(\lambda) \phi_l(\lambda) d\lambda d\tau. \quad (5)$$

In Eq. 4, $\underline{V}$ is the measurement vector and, if applicable, the offset from the sensing system. The inverse of the composite spectral function matrix $\underline{\xi}$, is predetermined using the basis vectors, scaling factor and the LED and detector spectra. This matrix is then stored in the look-up table memory 135.

Once the spectral characteristic determination device 140 has determined the spectral measurement system model, the model can be used for spectral reconstruction of the limited number of illuminant devices. Specifically, once the model is known, the spectral reconstruction is merely the use of the model on the real-time color measurements or every time a color is measured.

In particular, the following steps are sequentially executed whenever a complete set of measurements are available for each color.

First, the coefficient determination device 150, at the direction of the controller 120, multiplies the $\xi^{-1}$ matrix by the measurement vector, $\underline{V}$, to determine the coefficient vector, $\underline{\alpha}$, see Eq. 4.

Since it is necessary to calibrate the detector output of the sensor array 110 periodically, use of a white tile calibration look-up table, which is stored in look-up table memory 135, is a standard practice in the color measurement industry. When the white tile calibration look-up table is used, the detector output is normalized to between 0 to 1 in accordance with the following equation:

$$V_i = (V_i - V_i^o)/(V_i^{fs} - V_i^o), \quad (6)$$

where $V_i^o$ is the black measurement sensing system offset of the $i^{th}$ LED in Eqs. 3 and 6, $V_i^{fs}$ is the white tile measurements and $v_i$ is the sensor detector output. If the normalization stated above is used for the detector output, then the offset is not required in the measurement vector shown in Eq. 4.

Next, to determine the reflectance curve, the elements of the coefficient vector are multiplied by the basis vectors at preset wavelength intervals by the basis vector weighing device 160, see Eq. 2. The output of the basis vector weighing device 160 provides the spectra which is output by the spectral curve output device 170 and can be used for quality control, color management, printer characterization, color balancing, or the like.

Figure 4:
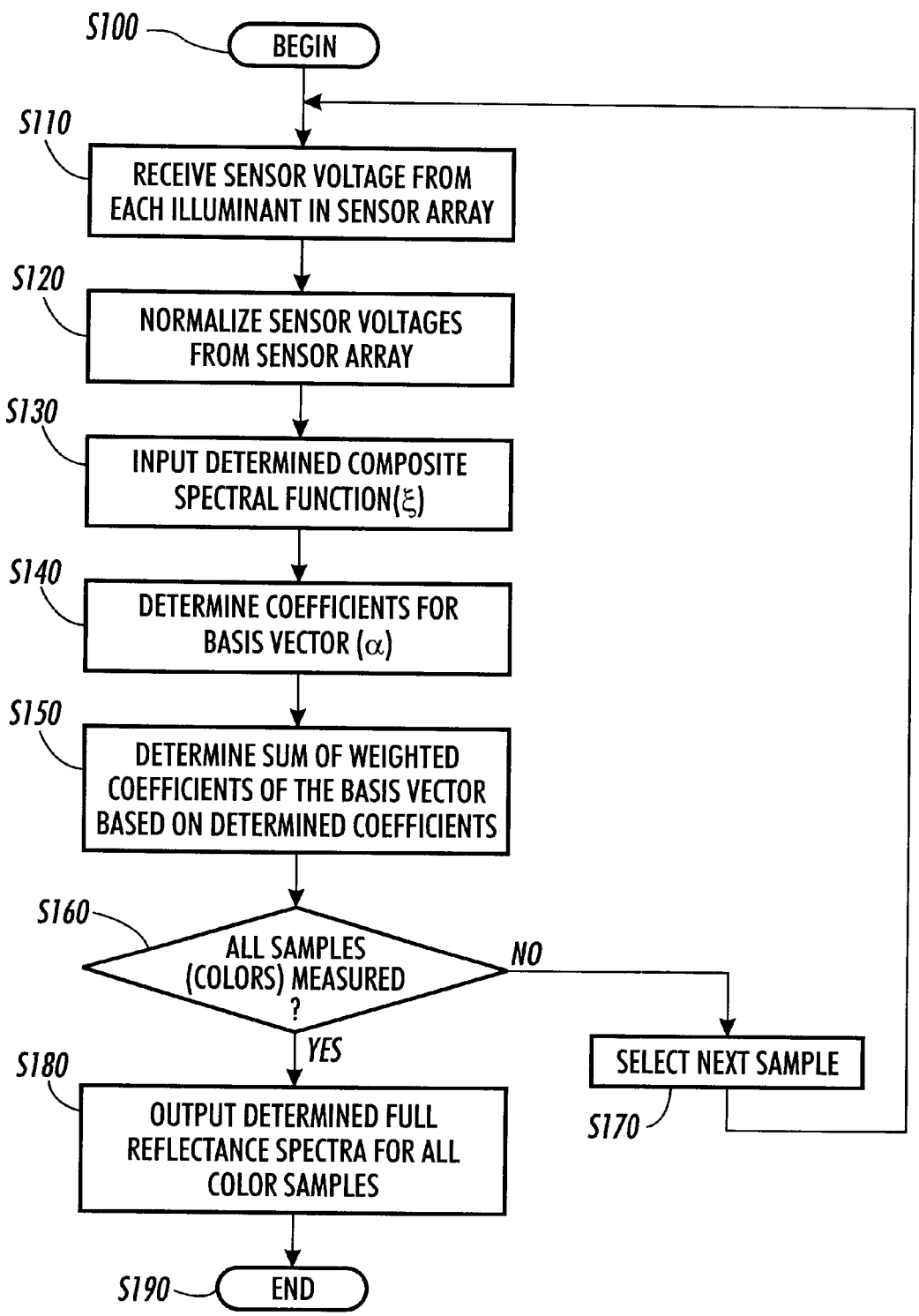
FIG. 4 is a flowchart outlining one exemplary embodiment of a method for determining a spectral curve according to this invention.

FIG. 4 is a flowchart illustrating an exemplary method for determining a reflectance spectra for a color sample. Specifically, control begin in step S100 and continues to step S110.

In step S110, the sensor voltages are received from each illuminant in the sensor array. Next, in step S120, the sensor voltages from the sensor array are normalized based on a white tile calibration look-up table. Then, in step S130, the determined composite spectral function ($\xi$) is input. Control then continues to step S140.

In step S140, the coefficients for the basis vector ($\underline{\alpha}$) are determined. Next, in step S150, the sum of the weighted coefficients of the basis vector are determined based on the determined coefficients. Then, in step S160, a determination is made whether all color samples have been measured. If all color samples have been measured, control jumps to step S180. Otherwise control continues to step S170.

In step S170, the next color sample is selected, control then continues to step S110.

In step S180, the determined full reflectance spectra is output for all color samples. Control then continues to step S190 where the control sequence ends.

As shown in FIG. 2, the spectral curve reconstruction device is preferably implemented either on a single program general purpose computer or separate programmed general purpose computer, with an associated multiple illuminant sensor array and spectral curve output devices. However, the spectral curve reconstruction device can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowchart shown in FIG. 4 can be used to implement the spectral curve reconstruction device according to this invention.

Furthermore, the disclosed method may be readily implemented in software using object or object-oriented software development environments that provide portable source code that can be used on a variety of computer or workstation hardware platforms. Alternatively, the disclosed spectral curve reconstruction device may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The image processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed method may be readily implemented as software executed on a programmed general purpose computer, a special purpose computer, a microprocessor, or the like. In this case, the method and system of this invention can be implemented as a routine embedded on a personal computer or as a resource residing on a server or workstation, such as a routine embedded in a photocopier, a color photocopier, a printer driver, a scanner, or the like. The spectral curve reconstruction device can also be implemented by physically incorporating the system and method into a software and/or hardware system, such as the hardware and software system of a photocopier or a dedicated image processing system.

It is, therefore, apparent that there has been provided in accordance with the present invention, a system and method for determining a spectral curve. While this invention has been described in conjunction with preferred embodiments thereof, it is evident that many alternatives, modifications and variations be apparent to those skilled in the art. Accordingly, Applicants intend to embrace all such alternatives, modifications and variations that follow in the spirit and scope of this invention.

What is claimed is:

1. A spectral reconstruction system comprising:
    a spectral characteristic determination device that determines a reflectance spectra of a substrate from at least one illumination device and a spectral measurement system model, the spectral measurement system model being defined as:

$$V_i = k_i \int_0^{\tau_i} \int_{\lambda_{\min}}^{\lambda_{\max}} S_i(\lambda) R(\lambda) D(\lambda) \, d\lambda \, d\tau + V_i^o,$$

where, for an ith illumination device, $\tau_i$ is an integration time for an illumination device switching event, $V_i$ is a measure of the amount of integrated light flux at the output of a detector circuit, $V_i^o$ is a sensor offset, $k_i$ is a scaling factor, $R(\lambda)$ is a collective reflectance spectra of a color, $D(\lambda)$ is a detector spectral response, and $S_i(\lambda)$ is a spectra of the ith illumination device.

2. The system of claim 1, wherein reflectance spectra $R(\lambda)$ is modeled as:

$$R(\lambda) = \sum_{l=0}^{N} \alpha_l \phi_l(\lambda),$$

where $\phi_1(\lambda)$ for $1=0,1,2,\ldots,N$, where N is the number of a basis vector.

3. The system of claim 2, further wherein:

$$\begin{bmatrix} \alpha_1 \\ \alpha_2 \\ \vdots \\ \alpha_N \end{bmatrix} = \begin{bmatrix} \xi_{11} & \xi_{12} & \cdots & \xi_{1N} \\ \xi_{21} & \xi_{22} & & \xi_{2N} \\ & & & \\ \xi_{M1} & \xi_{M2} & & \xi_{MN} \end{bmatrix}^{-1} \begin{bmatrix} V_1 - V_1^0 \\ V_2 - V_2^0 \\ \vdots \\ V_M - V_M^o \end{bmatrix} \text{ for } N = M,$$

or vector form, as;

$$\underline{\alpha} = \underline{\xi}^{-1} \underline{V},$$

where the matrix, $\xi$, containing matrix elements $\xi_{il}$ for $i=1,2,\ldots,M$ and $1=1,2,\ldots N$, are expressed by the following equation:

$$\xi_{il} = k_i \int_0^{\tau_i} \int_{\lambda_{\min}}^{\lambda_{\max}} S_i(\lambda) D(\lambda) \phi_l(\lambda) \, d\lambda \, d\tau,$$

where $\underline{V}$ is a measurement vector and, if applicable, the offset from the sensing system.

4. The system of claim 1, further comprising a color sensor that includes a plurality of illumination devices.

5. An image processing system incorporating the system of claim 1.

6. A photocopier incorporating the system of claim 1.

7. A spectral reconstruction method comprising:
determining a reflectance spectra of a substrate from at least one illumination device and a spectral measurement system model, the spectral measurement system model being defined as:

$$V_i = k_i \int_0^{\tau_i} \int_{\lambda_{\min}}^{\lambda_{\max}} S_i(\lambda) R(\lambda) D(\lambda) \, d\lambda \, d\tau + V_i^o,$$

where, for an ith illumination device, $\tau_i$ is an integration time for an illumination device switching event, $V_i$ is a measure of the amount of integrated light flux at the output of a detector circuit, $V_i^o$ is a sensor offset, $k_i$ is a scaling factor, $R(\lambda)$ is a collective reflectance spectra of a color, $D(\lambda)$ is a detector spectral response, and $S_i(\lambda)$ is a spectra of the ith illumination device.

8. The method of claim 7, wherein reflectance spectra $R(\lambda)$ is modeled as:

$$R(\lambda) = \sum_{l=0}^{N} \alpha_l \phi_l(\lambda),$$

where $\phi_1(\lambda)$ for $1=0,1,2,\ldots,N$, where N is the number of a basis vector.

9. The method of claim 8, further wherein:

$$\begin{bmatrix} \alpha_1 \\ \alpha_2 \\ \vdots \\ \alpha_N \end{bmatrix} = \begin{bmatrix} \xi_{11} & \xi_{12} & \cdots & \xi_{1N} \\ \xi_{21} & \xi_{22} & & \xi_{2N} \\ & & & \\ \xi_{M1} & \xi_{M2} & & \xi_{MN} \end{bmatrix}^{-1} \begin{bmatrix} V_1 - V_1^0 \\ V_2 - V_2^0 \\ \vdots \\ V_M - V_M^o \end{bmatrix} \text{ for } N = M,$$

or vector form, as;

$$\underline{\alpha} = \underline{\xi}^{-1} \underline{V},$$

where the matrix, $\xi$, containing matrix elements $\xi_{il}$ for $i=1,2,\ldots,M$ and $1=1,2,\ldots N$, are expressed by the following equation:

$$\xi_{il} = k_i \int_0^{\tau_i} \int_{\lambda_{\min}}^{\lambda_{\max}} S_i(\lambda) D(\lambda) \phi_l(\lambda) \, d\lambda \, d\tau,$$

where $\underline{V}$ is a measurement vector and, if applicable, the offset from the sensing system.

10. Software for implementing the method of claim 7.

11. A spectral reconstruction system comprising:
a spectral characteristic determination device that determines a reflectance spectra of a substrate from at least one illumination device and a spectral measurement system model that is based on an integration time for an illumination device switching event, a measure of the amount of integrated light flux at the output of a detector circuit, a collective reflectance spectra of a color, a detector spectral response, and a spectra of an illumination device.

12. The system of claim 11, further comprising a color sensor that includes a plurality of illumination devices.

13. An image processing system incorporating the system of claim 11.

14. A photocopier incorporating the system of claim 11.

15. The system of claim 11, wherein the collective reflectance spectra is modeled using basis vectors.

* * * * *